US012742709B2

(12) United States Patent
Yano et al.

(10) Patent No.: US 12,742,709 B2
(45) Date of Patent: Sep. 22, 2026

(54) IONIZED MATERIAL SAMPLE COLLECTION DEVICE AND COLLECTING METHOD

(71) Applicant: Japan Aerospace Exploration Agency, Tokyo (JP)

(72) Inventors: Hajime Yano, Chofu (JP); Yoshitsugu Sone, Chofu (JP); Eiji Hosono, Tsukuba (JP); Haruo Kishimoto, Tsukuba (JP); Hirokazu Kitaura, Tsukuba (JP); Daisuke Asakura, Tsukuba (JP); Tomohiro Ishiyama, Tsukuba (JP); Ayaka Takahashi, Chiba (JP); Minoru Umeda, Nagaoka (JP); Sayoko Inagawa, Nagaoka (JP)

(73) Assignee: Japan Aerospace Exploration Agency (JP)

( * ) Notice: Subject to any disclaimer, the term of this patent is extended or adjusted under 35 U.S.C. 154(b) by 272 days.

(21) Appl. No.: 18/578,692

(22) PCT Filed: Jul. 15, 2022

(86) PCT No.: PCT/JP2022/027877
§ 371 (c)(1),
(2) Date: Jan. 11, 2024

(87) PCT Pub. No.: WO2023/286861
PCT Pub. Date: Jan. 19, 2023

(65) Prior Publication Data

US 2024/0319049 A1 Sep. 26, 2024

(30) Foreign Application Priority Data

Jul. 16, 2021 (JP) ................................ 2021-118319

(51) Int. Cl.

| | |
|---|---|
| ***G01N 1/22*** | (2006.01) |
| ***G01N 1/10*** | (2006.01) |
| ***G01N 15/00*** | (2024.01) |

(52) U.S. Cl.
CPC ......... *G01N 1/2208* (2013.01); *G01N 1/2273* (2013.01); *G01N 2001/1018* (2013.01); *G01N 2015/0046* (2013.01)

(58) Field of Classification Search
CPC ............... G01N 1/2208; G01N 1/2214; G01N 2001/1006; G01N 2001/1018;

(Continued)

(56) References Cited

U.S. PATENT DOCUMENTS

| | | | | |
|---|---|---|---|---|
| 3,916,187 A * | 10/1975 | Fletcher | .................. | H01J 49/40 250/251 |
| 4,321,822 A | 3/1982 | Marple et al. | | |
| 2011/0265653 A1 | 11/2011 | Beer et al. | | |

FOREIGN PATENT DOCUMENTS

| | | |
|---|---|---|
| JP | 2004-301768 A | 10/2004 |
| JP | 2005-091118 A | 4/2005 |
| JP | 2018-077153 A | 5/2018 |

OTHER PUBLICATIONS

Jyoti, G. et al. "Mass Spectrometer Calibration of High Velocity Impact lonization Based Cosmic Dust Analyzer" International Journal of Impact Engineering 23 (1990) 401-408. (Year: 1990).*

(Continued)

*Primary Examiner* — Paul M. West
(74) *Attorney, Agent, or Firm* — OSTROLENK FABER LLP

(57) ABSTRACT

An ionized material sample collection device according to the present invention includes one or a plurality of container's main bodies that each has a surrounding wall and a bottom wall and has a sample entrance in an upper portion of the surrounding wall, a sample impact target that is (Continued)

formed in the bottom portion of each of the container's main bodies, and one or more ionized material collection zones that are formed on at least one of the inner surfaces and the bottom surface of the surrounding wall of each of the container's main bodies. It is preferable that a plurality of the ionized material collection zones be formed on the inner surfaces of the surrounding wall and each of the plurality of ionized material collection zones be an ionized material collection zone which has an affinity for a different element.

9 Claims, 6 Drawing Sheets

(58) Field of Classification Search
CPC ......... G01N 1/2273; G01N 2001/2279; G01N 2015/0042; G01N 2015/0046
See application file for complete search history.

(56) References Cited

OTHER PUBLICATIONS

International Search Report mailed Sep. 13, 2022 in corresponding PCT International Application No. PCT/JP2022/027877.

Tabata, Makoto et al., "Ultralow-density double-layer silica aerogel fabrication for the intact capture of cosmic dust in low-Earth orbits", Journal of Sol-Gel Science and Technology, 77(2), pp. 325-334, (2016).

Tabata, Makoto et al., "Silica aerogel for capturing intact interplanetary dust particles for the Tanpopo experiment", Origins of Life and Evolution of Biospheres, 45(1-2), pp. 225-229, (2015).

Shibata, Hiromi, "In Situ Measurement of Cosmic Dust and Hypervelocity Dust Acceleration", Radiation Chemistry, 2015, No. 99, pp. 33-44 [retrieved on Aug. 31, 2022] (English Abstract).

Kurihara et al., "Micro-debris collision frequency analysis of dandelion collection panel", Proceedings of Space Plasma Conference, vol. 2013, 2014, pp. 1-3 [retrieved on Aug. 31, 2022].

Extended European Search Report mailed Jun. 4, 2025 in corresponding European Patent Application No. 22842202.8.

J.P. Pabari et al.: "Orbital altitude dust at Mars, its implication and a prototype for its detection", Planetary and Space Science, vol. 161, Oct. 1, 2018 (Oct. 1, 2018), pp. 68-75, XP093275092, GB ISSN: 0032-0633, DOI: 10.1016/j.pss.2018.06.008.

Ralf SRAMA et al.: "Sample return of interstellar matter (SARIM)", Experimental Astronomy, Kluwer Academic Publishers, Dordrecht, NL, vol. 23, No. 1, May 3, 2008 (May 3, 2008), pp. 303-328, XP036256297, ISSN: 0922-6435, DOI: 10.1007/S10686-008-9088-7 [retrieved on May 3, 2008].

Office Action mailed Sep. 9, 2025 in corresponding Japanese Patent Application No. 2021-118319 with an English translation.

* cited by examiner

FIG. 2

IONIZED MATERIAL SAMPLE COLLECTION DEVICE AND COLLECTING METHOD

TECHNICAL FIELD

The present invention relates to an ionized material sample collection device and a collecting method.

Priority is claimed on Japanese Patent Application No. 2021-118319, filed Jul. 16, 2021, the content of which is incorporated herein by reference.

BACKGROUND ART

Solid microparticles smaller than 1 mm are countlessly present in outer space. Solid microparticles, which are called cosmic dust or micrometeoroids, derived from small solar system bodies such as comets and asteroids and from interstellar matter are present in interplanetary space including the Earth. As yet, it is thought that tens of thousands of tons of cosmic dust reaches the Earth every year and it is considered that some of them may include the constituent substances of seawater on Earth or source materials for life. Hence, it is thought that scientific information related to the sea of the Earth, life, the origins and evolution of the solar system itself, and outer space beyond the solar system can be achieved by analyzing and researching these natural solid microparticles of indiscernible sizes.

Meanwhile, solid substances, which are called space debris, derived from human space activities are orbiting around the Earth, and observation, measurement, collection, analysis, research, and the like on these space debris, as hazardous substances which may cause physical destruction, postural disturbance, surface deterioration, contamination, or the like of artificial satellites in operation, have proceeded.

Factors making it difficult to collect these solid microparticles present in outer space include the fact that the velocity with which they encounter a spacecraft attains a range of a hypervelocity, in addition to the sizes thereof which are so small that the particles are indiscernible. For example, the orbital velocity of space debris in low-Earth orbit is about 8 km per second, and the velocity of cosmic dust originating from comets (which can be sources of some meteor showers) encountering the Earth reaches up to 70 km per second.

In the Japanese Aerospace Exploration Agency, regarding an experiment on collecting these solid microparticles in outer space, a collection-dedicated panel was exposed on an outer wall portion of the International Space Station (ISS) for over a year and was then brought back to the laboratory on the ground, and collected samples were continuously analyzed for five years from 2015 to 2020.

The panel described above is characterized in that the surface exposed to space is constituted of a low-density silica aerogel having a two-layer structure with a thickness of approximately 2 cm and an aluminum alloy external container fixing the silica aerogel to the outer wall of the ISS.

In addition, in order to collect microparticles that impact at a hypervelocity without completely destroying and metamorphosing them as little as possible, this panel has a system in which microparticles are decelerated by the silica aerogel and are collected before they reach the aluminum bottom surface. The panel is brought back to the Earth for microscopic study of captured residues of the impacted microparticles collected in the silica aerogel and impact features such as microcraters formed on an aluminum alloy external container.

In the 1990s, Europe and the United States started to collect solid microparticles in outer space using a similar panel in which a silica aerogel is mounted inside an aluminum alloy frame. However, the Japanese Aerospace Exploration Agency has performed space experiments using an aerogel with the lowest density ever, and it has succeeded in collecting microparticles in outer space (refer to Non-Patent Document 1 and Non-Patent Document 2).

CITATION LIST

Non-Patent Document

Non-Patent Document 1

Makoto Tabata, Hideyuki Kawai, Hajime Yano, Eiichi Imai, Hirofumi Hashimoto, Shin-ichi Yokobori, Akihiko Yamagishi, Ultralow-density double-layer silica aerogel fabrication for the intact capture of cosmic dust in low-Earth orbits, Journal of Sol-Gel Science and Technology, 77(2), p 325 to p 334, (2015).

Non-Patent Document 2

Makoto Tabata, Hajime Yano, Hideyuki Kawai, Eiichi Imai, Yuko Kawaguchi, Hirofumi Hashimoto, Akihiko Yamagishi: Silica aerogel for capturing intact interplanetary dust particles for the Tanpopo experiment, ORIGINS OF LIFE AND EVOLUTION OF BIOSPHERES, 45(1-2), p 225 to p 229, (2015).

SUMMARY OF INVENTION

Technical Problem

These technologies in the related art using a low-density collection material have focused on reducing destruction and metamorphosis by restraining the maximum temperature reached by impacting microparticles that decelerate while destroying the inside of the collection material.

Incidentally, it is considered difficult to collect solid microparticles, which impact at an extreme hypervelocity of 15 km per second or faster and have been examined for future deep space exploration, in a manner of completely avoiding destruction, melting, ionization, and the like even if a low-density collection material such as a silica aerogel is used, for example.

The present invention has been made in consideration of the foregoing problems of the technologies in the related art, and an object is to provide an ionized material sample collection device and a collecting method capable of reliably capturing substance information from solid microparticles impacting at an extreme hypervelocity in outer space.

Solution to Problem

The inventors reexamined the methods for collecting solid microparticles using a low-density collection material such as a silica aerogel and researched a capturing method based on a conception completely different from those in the related art regarding capturing substance information of solid microparticles flying at an extreme hypervelocity in outer space.

As a result, it is thought that substance information of impacting microparticles can be made to remain on an inner wall surface of a container of a sample collection device if mixtures of ionized substances and gas substances, which have been generated by causing solid microparticles that have primarily impacted with a target in a velocity range at the level described above to be intentionally turned into plasma, are caused to secondarily impact with the wall surface of the collection container by means of plasma coating and a reactive sputtering method.

The present invention is an invention devised to resolve the foregoing problems and has the following constitutions as means.

(1) An ionized material sample collection device according to the present aspect includes one or a plurality of container's main bodies that each has a surrounding wall and a bottom wall and has a sample entrance in an upper portion of the surrounding wall, a sample impact target that is formed in the bottom portion of each of the container's main bodies, and one or more ionized material collection zones that are formed on at least one of the inner surfaces and the bottom surface of the surrounding wall of each of the container's main bodies.

According to the present aspect, if a spacecraft having the ionized material sample collection device mounted therein moves in outer space or is present in outer space, solid microparticles present in outer space fly toward the sample collection device and rush into the container's main body through the sample entrance of the container's main body at a hypervelocity.

If solid microparticles impact with the sample impact target provided in the bottom portion of the container's main body, mixtures of gas substances generated from gasified solid microparticles and ionized substances generated from solid microparticles turned into plasma are emitted from the sample impact target and impact with the ionized material collection zones on at least one of the inner surfaces and the bottom surface of the surrounding wall. Since outer space is a vacuum, mixtures of ionized substances and gas substances derived from solid microparticles are adsorbed onto the ionized material collection zones. Accordingly, mixtures of ionized substances and gas substances derived from solid microparticles can be collected in the ionized material collection zones as deposits.

In addition, on the presumption that the ionized material collection zones are also turned into plasma together with constituent materials of microparticles at the time of collision of the microparticles due to the ionized material collection zones arranged on the bottom surface of the container's main body for collection, it is also possible to adopt a constitution in which both constituent elements of microparticles and the ionized material collection zones are turned into plasma and are deposited and collected in an inner wall.

(2) In the ionized material sample collection device according to the present invention, it is preferable that a plurality of the ionized material collection zones be formed on at least one of the inner surfaces and the bottom surface of the surrounding wall, and each of the plurality of ionized material collection zones be an ionized material collection zone which has an affinity for a different element.

The solid microparticles rush into the sample impact target in the bottom portion of the container's main body at a hypervelocity, and substances derived from the solid microparticles and turned into plasma impact with the ionized material collection zones. If the ionized material collection zones are constituted using a material having a low affinity for mixtures of gas substances generated from gasified solid microparticles and ionized substances generated from solid microparticles turned into plasma, there is a low probability that the mixtures will adhere to the ionized material collection zones, and thus the probability of deposition of the mixtures is reduced.

If the ionized material collection zones are constituted using a material having a high affinity for mixtures of gas substances generated from gasified solid microparticles and ionized substances generated from solid microparticles turned into plasma, there is a high probability that the mixtures will adhere to the ionized material collection zones, and thus the probability of deposition of the mixtures increases. Accordingly, ionized substances originating from solid microparticles can be reliably collected in the ionized material collection zones.

(3) In the sample collection device according to the present invention, it is preferable that the ionized material collection zone be an ionized material collection zone in which ionized materials generated from particles that have impacted with the sample impact target at a hypervelocity are deposited. The ionized materials resulting from particles that have impacted at a hypervelocity are efficiently deposited in the ionized material collection zone.

(4) In the ionized material sample collection device according to the present invention, it is preferable that the ionized material collection zone be an annular ionized material collection zone which has a predetermined width from the bottom wall side to the sample entrance side of the surrounding wall and is formed on the inner surfaces of the surrounding wall or an ionized material collection zone which is formed on the bottom surface, and a plurality of the ionized material collection zones be formed from the bottom surface side toward the sample entrance side.

Mixtures of gas substances and ionized substances, which are generated when solid microparticles that have rushed into the container's main body at a hypervelocity impact with the sample impact target in the bottom portion of the container's main body, impact with the annular ionized material collection zone provided at a different position on a wall inner surface or the ionized material collection zone on the bottom surface. Since mixtures of gas substances and ionized substances accompanying solid microparticles vary depending on the kind of element constituting the solid microparticles, they can be efficiently deposited in any of the plurality of ionized material collection zones.

(5) The ionized material sample collection device according to the present invention can employ a constitution including a plurality of container's main bodies, in which each of the ionized material collection zones formed in each container is an ionized material collection zone which has an affinity for a different element.

Collected elements can be segregated in respective container's main bodies by preparing as many container's main bodies as the ionized material collection zones made of different materials.

(6) In the ionized material sample collection device according to any one of (1) to (5) of the present invention, it is preferable that the ionized material collection zone be made of one or more of a resin, stainless steel, boron-doped silicon, titanium, gold, lithium, copper, a hydrogen absorbing alloy, a transition metal, a metal oxide, and tungsten.

When the ionized material collection zone is a resin layer, since it has an affinity for one or more of Ti, V, Cr, Mn, Fe, Co, N, and O, ionized substances derived from these atoms included in solid microparticles can be deposited.

When the ionized material collection zone is a stainless steel layer, since it has an affinity for one or both Cr and CrN, ionized substances derived from these atoms included in solid microparticles can be deposited.

When the ionized material collection zone is a boron-doped silicon layer, since it has an affinity for CrN, ionized substances derived from CrN included in solid microparticles can be deposited.

When the ionized material collection zone is a titanium layer, since it has an affinity for Ca, P, and O, ionized substances derived from these atoms included in solid microparticles can be deposited.

When the ionized material collection zone is a gold layer, since it has an affinity for Co, C, and N, ionized substances derived from these atoms included in solid microparticles can be deposited.

When the ionized material collection zone is a lithium layer, since it has an affinity for Mg, Na, Si, and Al, ionized substances derived from these atoms included in solid microparticles can be deposited.

When the ionized material collection zone is hydrogen absorbing alloy layers, since it has an affinity for H, ionized substances derived from hydrogen atoms included in solid microparticles can be deposited.

When the ionized material collection zone is a transition metal layer, since it has an affinity for P, any of Sc, Ti, V, Cr, Mn, Fe, Co, and Cu is selected, and ionized substances derived from P included in solid microparticles can be deposited.

While having Ti, Mn, and Fe as target elements, when a metal oxide layer of an element not coinciding with the metal elements to be collected is applied as the ionized material collection zone, on the assumption that Ti, Mn, and Fe are elements M, they can be distinguished from collected oxygen by collecting M-O compounds and using oxygen isotopes.

When the ionized material collection zone is a tungsten layer, since tungsten has an affinity for C, ionized substances derived from C included in solid microparticles can be deposited.

In order to identify elements originating from solid microparticles that impact with the material of the ionized material collection zone, isotopic elements can be utilized for the material of the ionized material collection zone, and therefore it is possible to distinguish whether the elements are elements prepared on the Earth or are components collected in outer space based on differences in isotopic ratio.

(7) In the ionized material sample collection device according to (1) of the present invention, it is preferable that the ionized material collection zone be an annular ionized material collection zone which has a predetermined width from the bottom wall side to the sample entrance side of the surrounding wall and is formed on the inner surfaces of the surrounding wall or an ionized material collection zone which is formed on the bottom surface, and a plurality of the ionized material collection zones be formed from the bottom surface side toward the sample entrance side. It is preferable that the ionized material collection zone be split into a plurality of split layers in a circumferential direction of the surrounding wall, and each of the plurality of split layers have an affinity for a different element.

If the ionized material collection zone is split into a plurality of split layers such that each split layer has an affinity for a different element, it is possible to provide a plurality of split layers in which ionized substances derived from a plurality of elements can be deposited in the circumferential direction of the inner wall of the container's main body.

(8) In the ionized material sample collection device according to (7) of the present invention, it is preferable that the ionized material collection zone be made of one or more of a resin, stainless steel, boron-doped silicon, titanium, gold, lithium, copper, a hydrogen absorbing alloy, a transition metal, a metal oxide, and tungsten.

(9) In the ionized material sample collection device according to any one of (1) to (8) of the present invention, it is preferable that the sample impact target be constituted of a concave curved surface or an uneven surface.

Mixtures of gas substances and ionized substances generated at the time of collision of solid microparticles can be reliably emitted to the inner surface side of the surrounding wall by the concave curved surface or the uneven surface, and mixtures of gas substances and ionized substances can be reliably caused to impact with the plurality of ionized material collection zones provided on the inner surfaces of the surrounding wall and the inner surfaces of the bottom wall. Accordingly, mixtures of gas substances and ionized substances originating from solid microparticles can be reliably collected in the ionized material collection zones.

(10) An ionized material collecting method according to the present invention includes mounting the ionized material sample collection device according to any one of (1) to (9) in a spacecraft, causing hypervelocity solid microparticles flying from outer space to rush into the container's main bodies, causing a mixture of gas substances and ionized substances originating from the solid microparticles generated due to collision of the solid microparticles that have rushed in with the sample impact target to impact with the ionized material collection zones, and depositing the mixture of gas substances and ionized substances originating from the solid microparticles on the ionized material collection zones.

Mixtures of gas substances and ionized substances originating from solid microparticles that have rushed into the container's main body at a hypervelocity are emitted from the sample impact target in the bottom portion of the container's main body and impact with the ionized material collection zones provided on the inner surfaces of the surrounding wall. Accordingly, mixtures of gas substances and ionized substances resulting from solid microparticles can be deposited and collected in the ionized material collection zones.

Advantageous Effects of Invention

According to the present invention, if a spacecraft having the ionized material sample collection device mounted therein moves in outer space or is present in outer space, solid microparticles present in outer space fly toward the sample collection device and rush into the container's main body through the sample entrance of the container's main body at a hypervelocity.

If solid microparticles impact with the sample impact target provided in the bottom portion of the container's main body, mixtures of gas substances generated from gasified solid microparticles and ionized substances generated from solid microparticles turned into plasma are emitted from the sample impact target, and mixtures of gas substances and ionized substances originating from solid microparticles impact with the ionized material collection zones on at least one of the inner surfaces and the bottom surface of the surrounding wall. Since outer space is a vacuum, if solid microparticles move at a hypervelocity and impact with the sample impact target, mixtures of ionized substances and gas substances derived from solid microparticles impact with the ionized material collection zones. Accordingly, mixtures of ionized substances and gas substances derived from solid microparticles can be deposited in the ionized material collection zones, and substance information of the solid microparticles can be collected.

BRIEF DESCRIPTION OF DRAWINGS

FIG. 2 is an explanatory cross-sectional view of an example of a state in which solid microparticles have rushed into the same sample collection device.

DESCRIPTION OF EMBODIMENTS

First Embodiment

Hereinafter, regarding an ionized material sample collection device according to a first embodiment of the present invention, details of the present invention will be described with examples. However, the present invention is not limited to the embodiments which will be described below.

Figure 1:
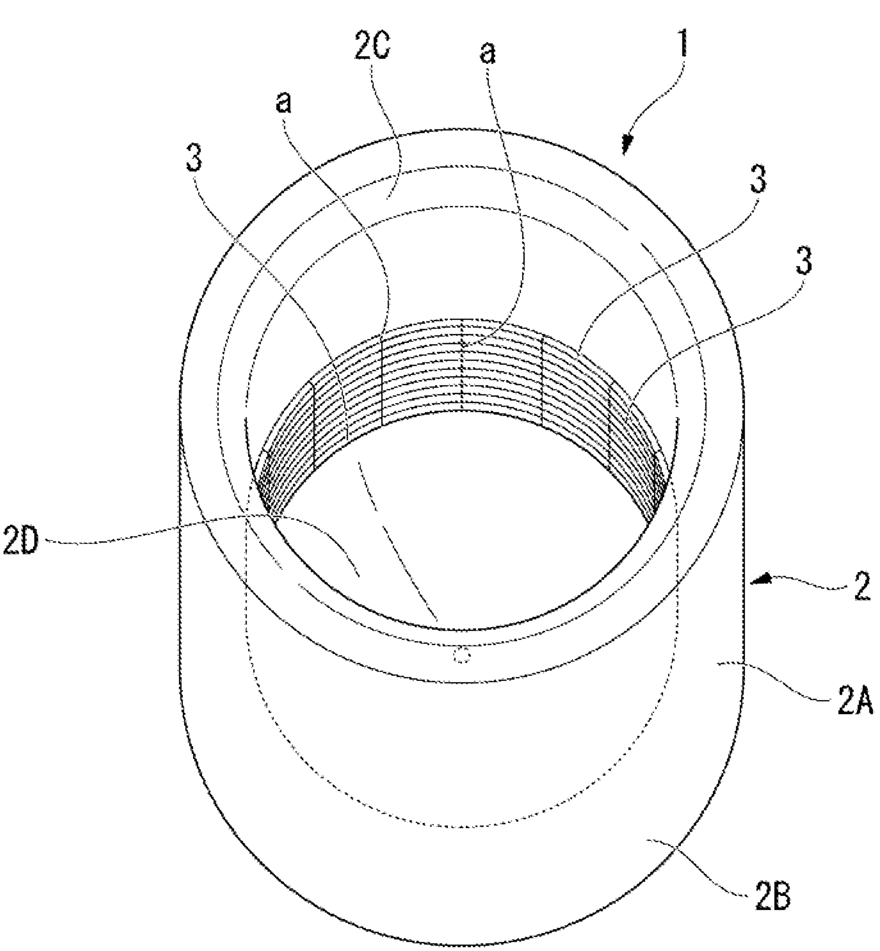
FIG. 1 is a perspective view of a sample collection device according to a first embodiment of the present invention.
Figure 2:
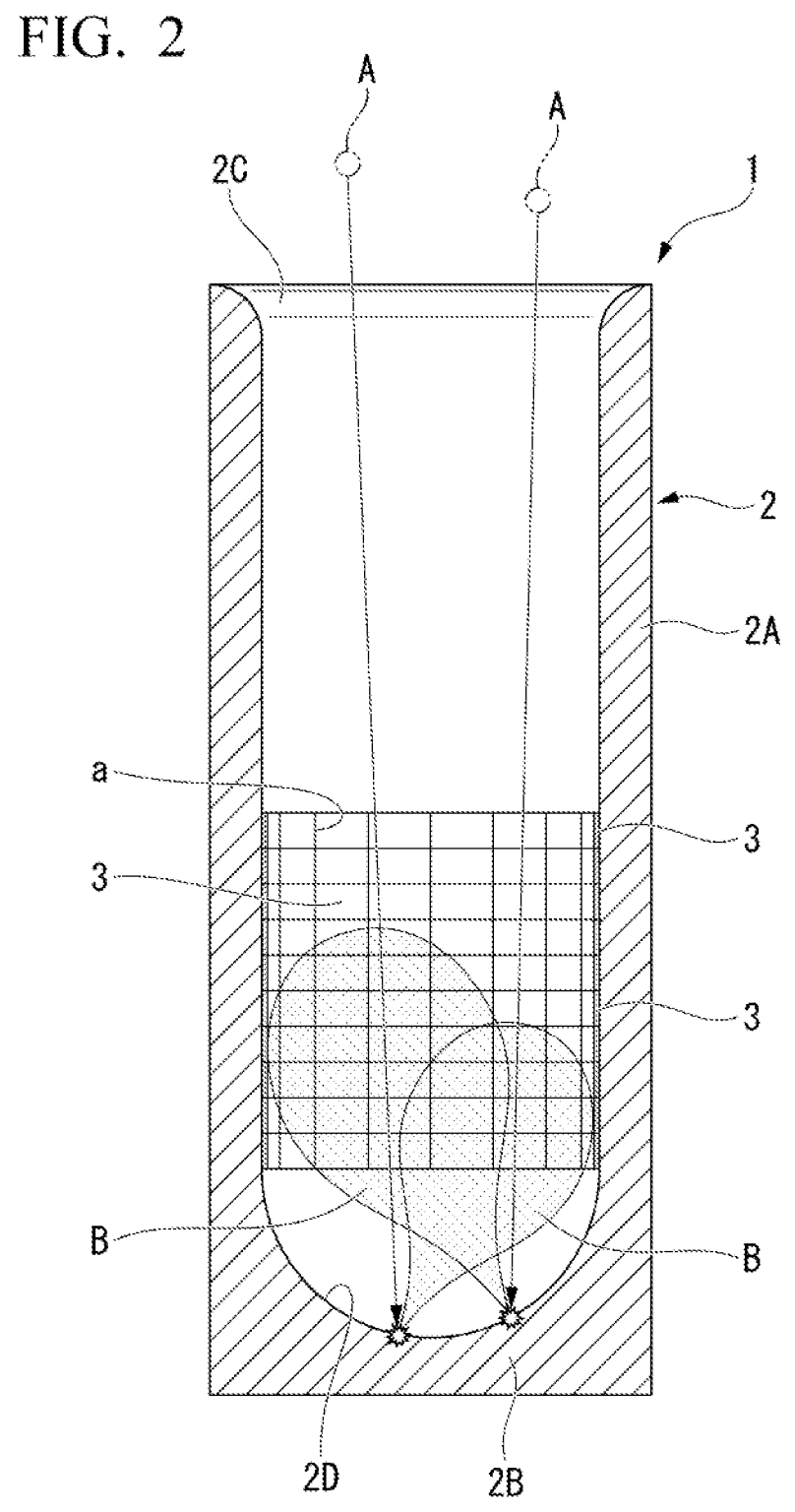

FIG. 1 is a perspective view illustrating an ionized material sample collection device 1 according to the first embodiment of the present invention, and FIG. 2 is an explanatory cross-sectional view of an example in a state in which solid microparticles A have rushed into the same sample collection device 1.

The sample collection device 1 of the present embodiment is constituted of tumbler-shaped container's main bodies 2 made of an aluminum alloy, a titanium alloy, a stainless steel alloy, a carbon fiber reinforced plastic structure (CFRP), or the like. The container's main bodies 2 each have a cylindrical surrounding wall 2A, and a bottom wall 2B closing an opening of the surrounding wall 2A on one side.

In the example of the diagram, since the container's main body 2 has a tumbler shape, the surrounding wall 2A is formed to have a height that is approximately several times the outer diameter of the bottom wall 2B, and an sample entrance 2C is formed in the surrounding wall 2A of the container's main body 2 on a side opposite to the bottom wall 2B. The container's main body 2 having a tumbler shape is merely an example, and there is no particular limitation on the ratio of the height of the surrounding wall 2A to the outer diameter of the bottom wall 2B. Compared to the shape illustrated in the diagram, a container shape in which the height of the surrounding wall 2A increased may be adopted, a container shape in which the height of the surrounding wall 2A is reduced may be adopted, and a container shape in which the outer diameter of the bottom wall 2B is further increased may be adopted. In addition, the surrounding wall 2A may have a rectangular tube shape or other shapes, and the planar shape of the bottom wall 2B may also have any shape such as a polygonal shape instead of a circular shape.

Moreover, a plurality of tumbler-shaped container's main bodies may be disposed adjacent to each other and may be constituted to have a plurality of sample entrances and bottom surfaces. A constitution in which a plurality of container's main bodies are disposed adjacent to each other will be described in the following embodiments.

A sample impact target 2D processed to have a concave curved surface shape is formed on an upper surface side in a bottom wall (bottom portion, bottom surface) 2B of the container's main body 2. In the example of FIGS. 1 and 2, the sample impact target 2D is formed to have a concave curved surface shape realized by hollowing out the upper portion of the bottom wall 2B into a hemispherical shape.

On the inner circumferential surface of the surrounding wall 2A, a plurality of ring-shaped (annular) ionized material collection zones 3 encircling the inner circumferential surface of the surrounding wall 2A are formed from the upper portion of the sample impact target 2D to part of the surrounding wall 2A on the center portion side in a height direction. In addition, the inner surfaces of the bottom wall 2B of the container's main body 2 also serves as the ionized material collection zone 3. The ionized material collection zones 3 are formed on at least one of the surrounding wall 2A and the bottom surface of the container's main body 2.

The ionized material collection zones 3 may be formed to have an annular shape on the inner surfaces of the surrounding wall 2A with a predetermined width from the bottom wall 2B side to the sample entrance 2C side of the surrounding wall 2A. Alternatively, the ionized material collection zones 3 may be formed in the bottom wall 2B with a predetermined width from the bottom wall 2B side to the sample entrance 2C side of the surrounding wall 2A. In the present embodiment, ten ionized material collection zones 3 in which the surrounding wall 2A has a uniform width in the height direction are formed. The heights (widths) of the ionized material collection zones 3 in the height direction of the surrounding wall 2A do not need to be all the same and may differ from each other.

The sample collection device 1 includes one or more ionized material collection zones 3. The ionized material collection zones 3 are layered. The plurality of layered ionized material collection zones 3 are formed on at least one of the inner surfaces and the bottom surface of the surrounding wall 2A of the container's main body 2. In the present embodiment, ten layers are formed from the upper portion of the sample impact target 2D toward part of the surrounding wall 2A on the center portion side in the height direction. There are ten layers constituted of the first layer, the second layer, and so on to the tenth layer in this order from the upper portion side of the sample impact target 2D.

The ionized material collection zones 3 are made of one or more of a resin, stainless steel, boron-doped silicon, titanium, gold, lithium, copper, a hydrogen absorbing alloy, a transition metal, a metal oxide, and tungsten.

In the ionized material collection zones 3, the first layer is constituted of a resin layer. Since a resin layer has an affinity for one or more of titanium (Ti), vanadium (V), chromium (Cr), manganese (Mn), iron (Fe), cobalt (Co), nitrogen (N), and oxygen (O), ionized substances derived from these atoms included in the solid microparticles A can be deposited.

In the ionized material collection zones 3, the second layer is constituted of a stainless steel layer. Since a stainless steel layer has an affinity for one or both Cr and CrN, ionized substances derived from these atoms included in the solid microparticles A can be deposited. When the container's main body 2 is made of stainless steel, the inner circumferential surface of the container's main body 2 can serve as the second ionized material collection zone 3 as it is.

In the ionized material collection zones 3, the third layer is constituted of a boron-doped silicon layer. In the case of a boron-doped silicon layer, since it has an affinity for CrN, ionized substances derived from CrN included in the solid microparticles A can be deposited.

In the ionized material collection zones 3, the fourth layer is constituted of a titanium layer. In the case of a titanium layer, since it has an affinity for calcium (Ca), phosphorus (P), and O, ionized substances derived from these atoms included in the solid microparticles A can be deposited.

In the ionized material collection zones 3, the fifth layer is constituted of a gold (Au) layer. In the case of a gold layer, since it has an affinity for Co, C, and N, ionized substances derived from atoms of any of these can be deposited. In the ionized material collection zones 3, the sixth layer is constituted of a lithium (Li) layer. In the case of a lithium layer, since it has an affinity for magnesium (Mg), sodium (Na), silicon (Si), and aluminum (Al), ionized substances derived from these atoms included in the solid microparticles A can be deposited.

In the ionized material collection zones 3, the seventh layer is constituted of the hydrogen absorbing alloy layers. In the case of the hydrogen absorbing alloy layers, since it has an affinity for hydrogen (H), ionized substances derived from hydrogen atoms can be deposited. Regarding the hydrogen absorbing alloys, the hydrogen absorbing alloys including any of $LaNi_5$, $TiMn_{1.5}$, $ZrMn_2$, TiFe, V (Ti, Cr), and $Mg_2Ni$ or any of Li, Na, Mg, Ca, Ti, and V can be employed.

In the ionized material collection zones 3, the eighth layer is constituted of a transition metal layer. Since a transition metal layer has an affinity for P, any of scandium (Sc), Ti, V, Cr, Mn, Fe, Co, and copper (Cu) of a transition metal is selected, and ionized substances derived from P can be deposited.

In the ionized material collection zones 3, for the ninth layer, while having Ti, Mn, and Fe as target elements, a metal oxide layer of an element not coinciding with the metal elements to be collected can be applied. On the assumption that Ti, Mn, and Fe are elements M, they can be distinguished from collected oxygen by collecting M-O compounds and using oxygen isotopes.

In the ionized material collection zones 3, the tenth layer is constituted of a tungsten (W) layer. In the case of a tungsten layer, since tungsten has an affinity for C, ionized substances derived from C included in the solid microparticles A can be deposited.

The disposition order of the first layer to the tenth layer is not limited to the example described above, and any sequence can be selected.

Since the surfaces of the ionized material collection zones 3 differ in surface state suited for collection due to the difference in kind of element of ionized materials, it is desirable to suitably adjust the surface roughness.

Collection efficiency can be increased by processing the surface roughness to optimal values between a mirror surface level to several tens of microns of Ra.

In addition, a structure in which each of the ionized material collection zones 3 is split into a plurality of parts in a circumferential direction of the surrounding wall 2A may be employed. In that case, in FIG. 1, boundary portions in the case of being split in the circumferential direction are indicated by straight partition lines a.

In each of the ionized material collection zones 3, a layer entirely having an affinity for the same substance may be formed in the circumferential direction as described above, or it may be a layer having an affinity for a different element for each region divided by the partition lines a. A specific structure in that case will be described in the following third embodiment.

The sample collection device 1 described above is used by being mounted in artificial satellites in orbits around the Earth, in spacecrafts making a voyage to other planets, satellites, comets, asteroids, and the like, and in spacecrafts making a voyage to deep space. It is desirable that the sample collection device 1 mounted in a spacecraft be mounted inside the spacecraft in a state of being concealed by a shutter device or the like, the shutter device be released in target outer space, and the sample entrances 2C of the container's main bodies 2 be opened to outer space such that the solid microparticles A can rush in. The installation position of the sample collection device 1 is not particularly limited, and it may be attached to the outer wall, the outward side, or the like of a spacecraft in an exposed state. Alternatively, it may be attached to the outer wall, the outward side, or the like of a spacecraft in a state in which lid plates closing the sample entrances 2C of the container's main bodies 2 are attached, and the sample entrances 2C of the container's main bodies 2 may be opened to outer space by detaching the lid plates in target outer space.

If a spacecraft having the sample collection device 1 mounted therein moves in target outer space or is present in target outer space, the solid microparticles A present in outer space fly toward the sample collection device 1 at a hypervelocity and rush into the container's main bodies 2 through the sample entrances 2C of the container's main bodies 2 as hypervelocity solid microparticles A.

If the hypervelocity solid microparticles A impact with the sample impact targets 2D provided in the bottom portions of the container's main bodies 2, as illustrated in FIG. 2, mixtures B of gas substances generated from the gasified solid microparticles A and ionized substances generated from the solid microparticles A turned into plasma are emitted from the sample impact targets 2D and impact with any of ten ionized material collection zones 3 on the inner surfaces of the surrounding wall.

In the ionized material collection zones 3, ionized materials generated from particles that have impacted with the sample impact targets 2D at a hypervelocity are deposited. Specifically, since outer space is a vacuum, if the solid microparticles A move at a hypervelocity and impact with the sample impact targets 2D, they are emitted as the mixtures B of gas substances and ionized substances originating from the solid microparticles A and impact with the ionized material collection zones 3. Accordingly, the mixtures of gas substances and ionized substances of the solid microparticles A can be deposited in any of ten ionized material collection zones 3, and substance information originating from the solid microparticles A can be collected.

Since the sample impact targets 2D have a concave curved surface realized by hollowing out the upper portion of the bottom wall into a hemispherical shape, mixtures of gas substances and ionized substances originating from the solid microparticles A that have impacted at positions shifted from the centers of the sample impact targets 2D are emitted to have a reflection angle for each collision position and impact with the inner surfaces and the bottom surface of the surrounding wall 2A.

For example, in any of the following cases when a spacecraft is orbiting in low-Earth orbits and the orbital velocity of the solid microparticles A such as fine space debris is 8 km per second, when the velocity of the solid microparticles A such as cosmic dust originating from comets encountering a spacecraft is a maximum of 70 km per second, and when the solid microparticles A travel at an extreme hypervelocity of 15 km per second or faster in deep space exploration, mixtures of gas substances and ionized substances originating from the solid microparticles A can be deposited in any of the ionized material collection zones 3, and substance information originating from the solid microparticles A can be collected.

If the solid microparticles A described above impact with the sample impact targets 2D at a hypervelocity of 8 km per second or 70 km per second or at an extreme hypervelocity of 15 km per second or faster, they generate shock waves and behave like fluids while being solids. Furthermore, after going through metamorphosis such as destruction, sublimation, and ionization, the mixtures of gas substances and ionized substances originating from the solid microparticles A are deposited in the ionized material collection zones 3 or the bottom surfaces of the container's main bodies 2.

A phenomenon in which these solid microparticles A impact with the ionized material collection zones 3 while being gasified and turned into plasma in outer space at the velocity described above is equivalent to that of the degree of vacuum under the condition of performing coating on a substrate by a chemical vapor deposition method (CVD), a physical vapor deposition method (PVD), or the like in a vacuum container on the ground.

For example, it is said that the degree of vacuum is approximately $10^{-4}$ to $10^{-5}$ Pa at a surface altitude of 400 km where the International Space Station orbits, is approximately $10^{-8}$ Pa in a geostationary orbit, and is $10^{-11}$ Pa in interstellar space. On the other hand, when a film forming chamber is caused to be a vacuum using a vacuum pump of a film forming device, the vacuum state is generally adjusted to be lower than $10^{-3}$ Pa. In addition, a film is formed on a substrate by generating plasma or the like at the degree of vacuum described above. Therefore, similar to the phenomenon in which a film is formed on a substrate by the CVD or the PVD, deposits can be obtained on the ionized material collection zones 3 or the bottom surface.

In addition, in the CVD or the PVD, deposition efficiency of a film formation material deposited on a substrate varies depending on suitability of the affinity between the substrate material used for various kinds of film formation and the constituent materials of the film to be deposited.

Similarly in the ionized material collection zones 3 used in the present embodiment, it can be said that deposits resulting from ionized substances of atoms having a high affinity for each of the layers, such as the first ionized material collection zone 3 to the tenth ionized material collection zone 3 described above, are likely to be deposited.

If the spacecraft described above is returned to the Earth and the sample collection device 1 is brought back, it is possible to realize returning of a sample of substance information of the solid microparticles A that have impacted at a hypervelocity such as an extreme hypervelocity, which has been considered difficult with the methods in the related art. Naturally, it is possible to realize returning of a sample of substance information of the solid microparticles A that have impacted at a hypervelocity.

In the sample collection device 1 which has been brought back, when deposits are present in the first ionized material collection zone 3, it is possible to estimate that ionized substances resulting from any of Ti, V, Cr, Mn, Fe, Co, N, and O were mainly deposited. Therefore, it is possible to estimate that the solid microparticles A including any of Ti, V, Cr, Mn, Fe, Co, N, and O were present in outer space through which the spacecraft described above passed.

When deposits are present in the second ionized material collection zone 3, it is possible to estimate that the solid microparticles A including any of Cr and CrN were present.

When deposits are present in the third ionized material collection zone 3, it is possible to estimate that the solid microparticles A including CrN were present.

When deposits are present in the fourth ionized material collection zone 3, it is possible to estimate that the solid microparticles A including any of Ca, P, and O were present.

When deposits are present in the fifth ionized material collection zone 3, it is possible to estimate that the solid microparticles A including any of Co, C, and N were present.

When deposits are present in the sixth ionized material collection zones 3, it is possible to estimate that the solid microparticles A including any of Mg, Na, Si, Al, O, and S were present.

When deposits are present in the seventh ionized material collection zones 3, it is possible to estimate that the solid microparticles A including H were present.

When deposits are present in the eighth ionized material collection zones 3, it is possible to estimate that the solid microparticles A including P were present.

When deposits are present in the ninth ionized material collection zone 3, it is possible to estimate that the solid microparticles A including any of Ti, Mn, and Fe were present.

When deposits are present in the tenth ionized material collection zone 3, it is possible to estimate that the solid microparticles A including C were present.

Therefore, by analyzing and ascertaining deposits in each of the ionized material collection zones 3, it is possible to estimate the presence of the solid microparticles A present in outer space when a spacecraft is orbiting in an orbit around the Earth or the elements included in the solid microparticles A present in deep space when heading for exploration of comets, asteroids, planets, satellites, and the like.

In the sample collection device 1 of the present embodiment, when other more elements are adopted as target collection objects, as many ionized material collection zones 3 as the required number may be provided, and the ionized material collection zones 3 made of a material having a high affinity for the target elements may be provided.

For example, when sulfur (S) is adopted as a collection target object element, a layer made of a material such as Cu or Li can be used.

In addition, since cosmic dust is expected to include information related to the origins and evolution of the solar system, the Earth, seawater, source materials for life, and the like, it is possible to contribute to development of new scientific knowledge by using the sample collection device 1 of the present invention mounted in a spacecraft. In addition, substances to be deposited in the ionized material collection zones 3 may be substances or the like resulting from solar wind in addition to cosmic dust.

Moreover, as long as the solid microparticles A are ionized, the present embodiment is not limited to outer space and can be applied on the Earth, such as sites near nuclear reactors and volcanoes, where it is difficult for humans to go in person for direct observation, and it is possible to provide new help in ascertaining constituent elements of the solid microparticles A in an unknown environment.

Second Embodiment

Figure 3:
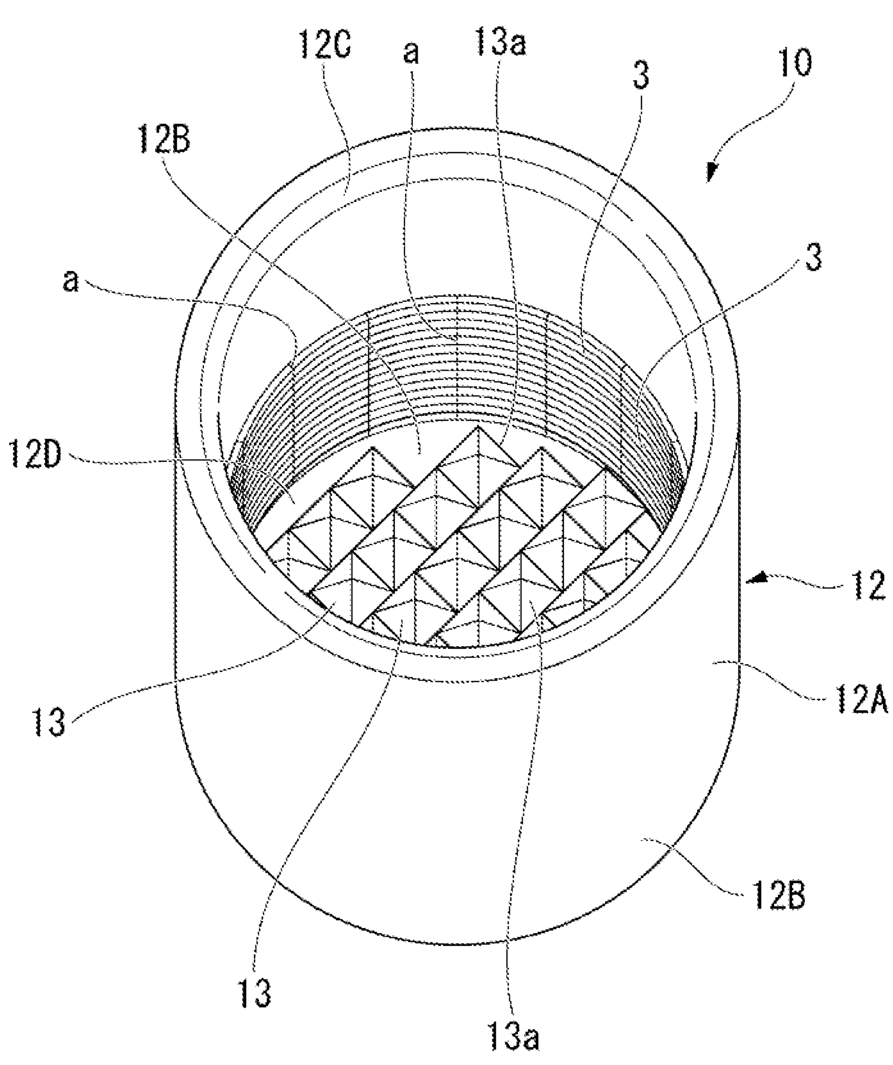
FIG. 3 is a perspective view of a sample collection device according to a second embodiment of the present invention.
Figure 4:
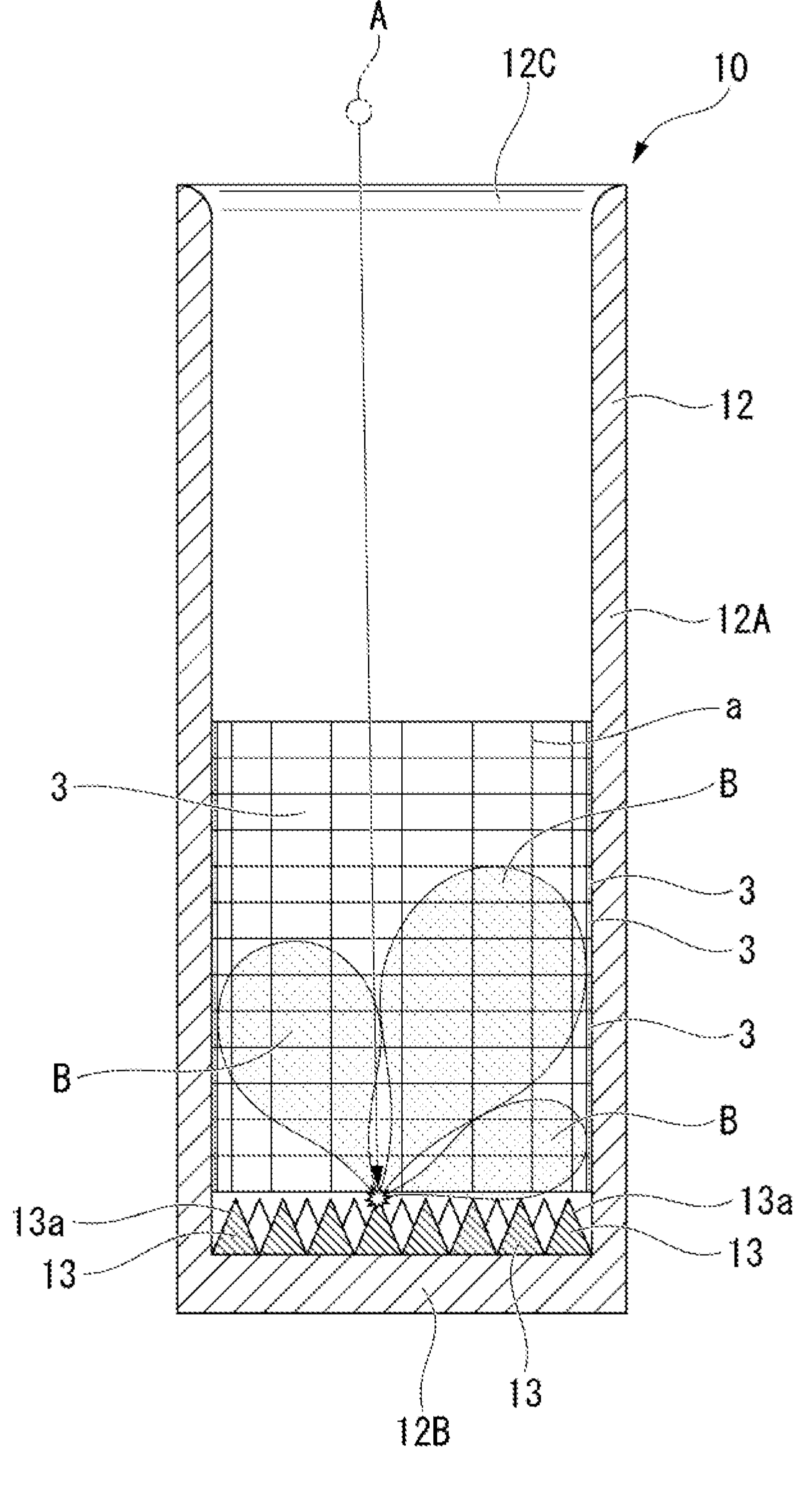
FIG. 4 is an explanatory cross-sectional view of an example of a state in which solid microparticles have rushed into the same sample collection device.

FIG. 3 is a perspective view illustrating a sample collection device according to a second embodiment of the present invention, and FIG. 4 is an explanatory cross-sectional view of an example of a state in which the solid microparticles A have rushed into the same sample collection device.

A sample collection device 10 of the present embodiment is constituted of tumbler-shaped container's main bodies 12 made of an aluminum alloy, a titanium alloy, a stainless steel alloy, a CFRP structure, or the like. The container's main bodies 12 each have a cylindrical surrounding wall 12A, and a bottom wall 12B closing an opening of the surrounding wall 12A on one side.

A sample impact target 12D constituted of an uneven surface having a plurality of quadrangular pyramid-shaped protrusions 13 formed thereon is formed on the upper surface side in the bottom wall 12B of the container's main body 12. Four inclined surfaces 13*a* are formed in each of the protrusions 13.

In the example of FIGS. 3 and 4, the bottom wall 12B is formed to have a flat plate shape, and the plurality of quadrangular pyramid-shaped protrusions 13 which are arrayed vertically and horizontally are formed on the upper surface side of this bottom wall 12B. In the example of FIGS. 3 and 4, the protrusions 13 are formed vertically and horizontally on the upper surface of the bottom wall 12B in approximately several rows to ten-odd rows and several columns to ten-odd columns. The protrusions 13 are each formed to have a height that is approximately 1/10 of the height of the surrounding wall 12A of the container's main body 12 in the example of FIGS. 3 and 4.

The heights and the widths of the protrusions 13 are not limited to the illustrated example, and arbitrary heights and widths can be selected. However, as long as the protrusions 13 each have the inclined surfaces 13*a* such that mixtures of gas substances and ionized substances originating from the solid microparticles A emitted due to collision of the solid microparticles A (which will be described below) can impact with the inner surfaces of the surrounding wall 12A, the shapes of the protrusions 13 do not particularly matter.

On the inner circumferential surface of the surrounding wall 12A, a plurality of ring-shaped (annular) ionized material collection zones 3 encircling the inner circumferential surface of the surrounding wall 12A are formed from the upper portion of the sample impact target 12D to part of the surrounding wall 12A on the center portion side in the height direction. The ionized material collection zones 3 provided in the present embodiment are the same as the ionized material collection zones 3 provided in the first embodiment.

The sample collection device 10 described above is used by being mounted in artificial satellites in orbits around the Earth, spacecrafts making a voyage to other planets, satellites, comets, asteroids, and the like, and spacecrafts making a voyage to deep space. The purpose of use and the using method are the same as those of the sample collection device 1 of the first embodiment.

In the sample collection device 10 as well, if the solid microparticles A rush in through a sample entrance 12C of the container's main body 12 and the solid microparticles A impact with the sample impact target 12D, they are emitted from the sample impact target 12D as illustrated in FIG. 4, and the mixtures B of gas substances and ionized substances originating from the solid microparticles A impact with the ionized material collection zones 3 on the inner surfaces of the surrounding wall.

Since outer space is a vacuum, if the solid microparticles A move at a hypervelocity and impact with the sample impact target 12D, the mixtures B of gas substances and ionized substances originating from the solid microparticles A are emitted and impact with the ionized material collection zones 3. Accordingly, the mixtures B of gas substances and ionized substances originating from the solid microparticles A can be deposited in the ionized material collection zones 3, and substance information originating from the solid microparticles A can be collected.

Since all the first to tenth ionized material collection zones 3 are made of the materials described above, it is possible to estimate the abundance and the substance constitution of the solid microparticles A from analysis of mixtures of gas substances and ionized substances originating from the solid microparticles A present in outer space through which the spacecraft passed by ascertaining the deposits which were deposited in each of the ionized material collection zones 3.

Furthermore, the sample collection device 10 of the second embodiment also exhibits operational effects equivalent to those of the sample collection device 1 in the foregoing first embodiment.

Third Embodiment

Figure 5:
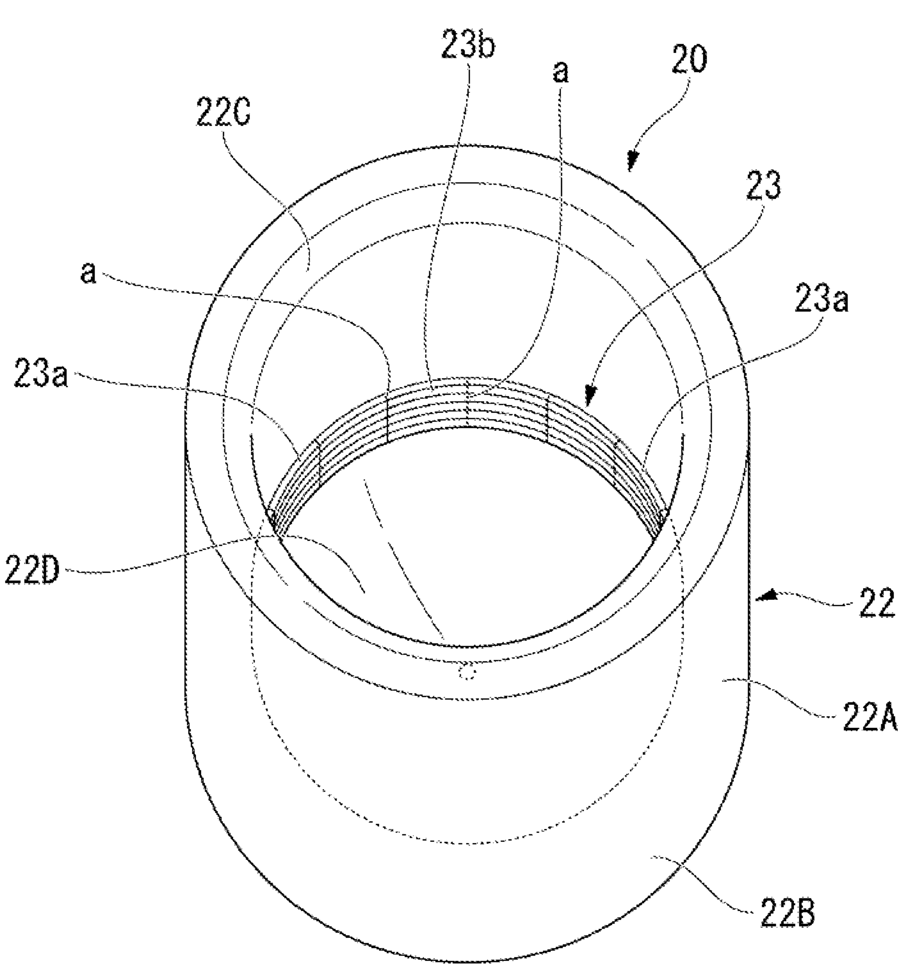
FIG. 5 is a perspective view of a sample collection device according to a third embodiment of the present invention.

FIG. 5 is a perspective view illustrating a sample collection device according to the third embodiment of the present invention. The structure of the present embodiment is the same as the structure of the first embodiment in that a sample collection device 20 is constituted of metal tumbler-shaped container's main bodies 22. The container's main bodies 22 each have a cylindrical surrounding wall 22A, and a bottom wall 22B closing an opening of the surrounding wall 22A on one side. The shape of a sample impact target 22D formed in the bottom wall 22B of the container's main body 22 is the same as that of the sample impact target 22D of the first embodiment.

The sample collection device 20 of the third embodiment differs from the sample collection device 1 of the first embodiment in constitution of ionized material collection zones 23.

On the inner circumferential surface of the surrounding wall 22A, ring-shaped (annular) ionized material collection zones 23 encircling the inner circumferential surface of the surrounding wall 22A are formed from the upper portion of the sample impact target 22D to part of the surrounding wall 22A on the center portion side in the height direction. In the present embodiment, five ionized material collection zones 23 having a uniform width in the height direction of the surrounding wall 22A are formed. In addition, each of the ionized material collection zones 23 is split into four split layers 23*a*, 23*b*, 23*a*, and 23*b* adjacent to each other in the circumferential direction of the surrounding wall 22A. The boundaries between the split layers 23*a*, 23*b*, 23*a*, and 23*b* are indicated by the partition lines a in the drawings for easy recognition.

In the constitution of the third embodiment, in the first ionized material collection zone 23, of the plurality of ionized material collection zones 23, at a position closest to a bottom wall 23B, the split layers 23*a* and 23*a* of the split layers 23*a*, 23*b*, 23*a*, and 23*b* are constituted of resin layers used in the first ionized material collection zone 3 of the first embodiment, and the split layer 23*b* is constituted of a stainless steel layer used in the second ionized material collection zone 3 of the first embodiment.

In the second ionized material collection zones 23, the split layers 23*a* and 23*a* are constituted of boron-doped silicon layers used in the third ionized material collection zone 3 of the first embodiment, and the split layers 23*b* and 23*b* are constituted of titanium layers used in the fourth ionized material collection zone 3 of the first embodiment.

In the third ionized material collection zones 23, the split layers 23*a* and 23*a* are constituted of gold layers used in the fifth ionized material collection zone 3 of the first embodiment, and the split layers 23*b* and 23*b* are constituted of lithium layers used in the sixth ionized material collection zones 3 of the first embodiment.

In the fourth ionized material collection zones 23, the split layers 23*a* and 23*a* are constituted of hydrogen absorbing alloy layers used in the seventh ionized material collection zones 3 of the first embodiment, and the split layers 23*b* and 23*b* are constituted of transition metal layers used in the eighth ionized material collection zones 3 of the first embodiment.

In the fifth ionized material collection zones 23, the split layers 23*a* and 23*a* are constituted of metal oxide layers used in the ninth ionized material collection zone 3 of the first embodiment, and the split layers 23*b* and 23*b* are constituted of tungsten layers used in the tenth ionized material collection zone 3 of the first embodiment.

According to the structure of the third embodiment, ionized substances derived from atoms such as Ti, V, Cr, Mn, Fe, Co, N, and O deposited in the split layer 23*a* of the first ionized material collection zone 23 can be secured, and ionized substances derived from atoms such as Cr and CrN can be secured in the split layer 23*b*.

In addition, ionized substances derived from atoms such as CrN deposited in the split layer 23*a* of the second ionized material collection zones 23 can be secured, and ionized substances derived from atoms such as Ca, P, and O can be secured in the split layer 23*b*.

In addition, ionized substances derived from atoms such as Co, C, and N deposited in the split layer 23*a* of the third ionized material collection zones 23 can be secured, and ionized substances derived from atoms such as Mg, Na, Si, and Al deposited in the split layer 23*b* can be secured.

In addition, ionized substances derived from H atoms deposited in the split layer 23*a* of the fourth ionized material collection zones 23 can be secured, and ionized substances derived from P atoms deposited in the split layer 23*b* can be secured.

In addition, ionized substances derived from any atom of Ti, Mn, and Fe deposited in the split layer 23*a* of the fifth ionized material collection zones 23 can be secured, and ionized substances derived from C atoms deposited in the split layers 23*b* can be secured.

According to the structure of the third embodiment, even with the first to fifth ionized material collection zones 23 in five vertical columns, ten kinds of layers can be used separately by providing different layers for collecting ionized substances in the split layers that are split in the circumferential direction of the surrounding wall 22A, and as many ionized substances derived from the atoms as the number equivalent to the ten ionized material collection zones 3 of the first embodiment can be collected.

As described above, it is possible to provide the split layers realized by splitting the ionized material collection zones 23 into a plurality of layers in the circumferential direction. Since the layers having an affinity for a different atom are used separately for each split layer, even if the number of ionized material collection zones 23 provided in the upward-downward direction of the container's main bodies 22 is reduced compared to the structure of the first embodiment, ionized substances corresponding to as many elements as those in the first embodiment can be collected.

In the present invention, by suitably adjusting the number of ionized material collection zones provided in the container's main body and the number of split layers, it is possible to correspond to the number of ionized substances (collection targets). For example, in the container's main bodies 22, if six columns of the ionized material collection zones 23 are provided vertically, split layers split into three in the circumferential direction are provided, and a layer having a high affinity for a different element is disposed for each split layer, layers having a high affinity for 18 kinds of patterned elements can be used separately. Naturally, more split layers may be provided, and deposits may be collected by layers corresponding to more kinds of elements.

In addition, since the lengths and the outer diameters of the container's main bodies used in the present invention can be adjusted to arbitrary sizes, it is possible to select the number of ionized material collection zones and the number of split layers corresponding to the number of collection target elements.

In the embodiments described above, the layered structure formed on the inner circumferential surface of the container's main body is employed as the ionized material collection zones, but the ionized material collection zones having ionized substances of solid microparticles deposited therein are not limited to the layered structure and may have a structure in which metal rings or resin rings are disposed in the inner surrounding wall of the container's main body.

For example, the ionized material collection zones may be constituted to have a structure in which a plurality of columns of rings made of respective materials constituting the first to tenth layered ionized material collection zones described above are disposed vertically along the inner circumferential surface of the container's main body. When the ionized material collection zones are rings made of various kinds of materials described above, there is an advantage in that deposits can be analyzed for each ring by detaching each of the rings from the container's main bodies 2, 12, and 22 after the container's main bodies 2, 12, and 22 are brought back to the Earth.

In addition, regarding the ionized material collection zones 3 and 23 formed in the container's main bodies 2, 12, and 22 according to the present invention, when the materials constituting the container's main bodies 2, 12, and 22 have an affinity for the target element, the inner circumferential surfaces of the container's main bodies 2, 12, and 22 can serve as the ionized material collection zones 3 and 23 as they are.

For example, in the foregoing embodiments, when a stainless steel layer is applied as the second ionized material collection zone 3, if the container's main body 2 is made of stainless steel, the inner circumferential surface of the container's main body 2 can be used as the second ionized material collection zone 3 as it is. In addition, when the container's main body 2 is made of titanium, the inner circumferential surface of the container's main body 2 can be used as the fourth ionized material collection zone 3 as it is.

Fourth Embodiment

Figure 6:
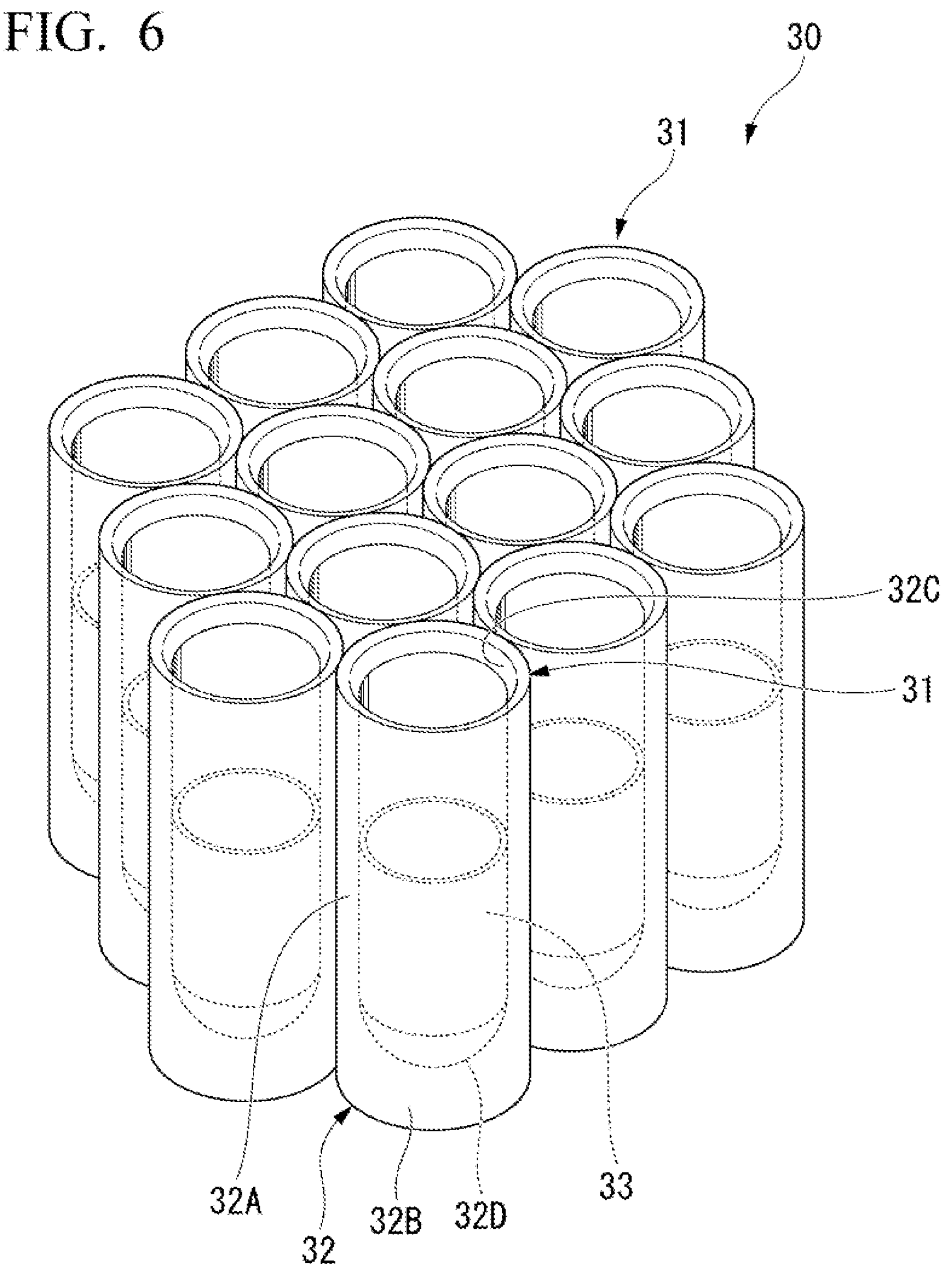
FIG. 6 is a perspective view of a sample collection device according to a fourth embodiment of the present invention.

FIG. 6 is a perspective view illustrating a sample collection device according to a fourth embodiment of the present invention.

A sample collection device 30 of the present embodiment is constituted of a plurality of metal tumbler-shaped container's main bodies 31. As an example, in the constitution of FIG. 6, fourteen container's main bodies 31 are constituted to be disposed adjacent to each other with the sample entrances toward the same side. Each of the container's main bodies 31 has a cylindrical surrounding wall 32A, and a bottom wall 32B closing an opening of the surrounding wall 32A on one side. The shape of a sample impact target 32D formed in the bottom wall 32B of the container's main body 31 is the same as that of the sample impact target 2D of the first embodiment.

In the container's main bodies 31 of the present embodiment, only one ionized material collection zone 33 is provided on the inner surfaces of the surrounding wall of each of the container's main bodies 31. For example, each of the container's main bodies 31 includes the ionized material collection zones 33 constituted of only one kind of layers of the layers constituting any of the first to tenth ionized material collection zones of the first embodiment described above. In the fourteen container's main bodies 31, one or more layers can be suitably selected and used from the layers constituting any of the first to tenth ionized material collection zones described above. In the collection target elements, a plurality of container's main bodies 31 including layers corresponding to collection of important elements are provided, and the number of container's main bodies 31 to be assembled can be arbitrarily selected by reducing or omitting the number of container's main bodies 31 including layers corresponding to the elements having low priority.

Therefore, for example, in the constitution of FIG. 6, if the ionized material collection zones 33 having an affinity for separate atoms are provided for each of the fourteen container's main bodies 31, 14 kinds of ionized materials can be individually collected by the container's main bodies 31 using the fourteen container's main bodies 31.

Naturally, there is no limitation on the number when the container's main bodies 31 are assembled, and there is no particular limitation on the number to be assembled. In accordance with the number of measurement target elements, container's main bodies 31 fewer than those in FIG. 6 may be assembled or container's main bodies 31 more than those in FIG. 6 may be assembled.

Similar to the foregoing first to third embodiments, the plurality of container's main bodies 31 are used by being mounted in artificial satellites, spacecrafts, and the like. The purpose of use and the using method are the same as those of the sample collection devices 1, 10, and 20 of the first to third embodiments.

In the sample collection device 30 of the fourth embodiment as well, if the solid microparticles A rush in through a sample entrance 32C of the container's main body 31 and the solid microparticles A impact with the sample impact target 32D, mixtures of gas substances and ionized substances originating from the solid microparticles A impact with the ionized material collection zones 33 on the inner surfaces of the surrounding wall, and ionized materials can be collected.

In the sample collection device 30 of the fourth embodiment, collected elements can be segregated in the respective container's main bodies 31 by preparing as many container's main bodies 31 as the ionized material collection zones 33 made of different materials. Since the layers constituting the ionized material collection zones 33 provided in each of the container's main bodies 31 are ascertained in advance, when ionized materials deposited in the ionized material collection zones 33 are analyzed, an analysis method specialized for a particular element can be employed, and therefore analysis is also facilitated.

Incidentally, in the present invention, when the locations of plasma generated inside the container's main bodies are controlled and the constituent components of the solid microparticles turned into plasma and/or the materials of the ionized material collection zones are mixed at a high concentration, it is preferable to add a device for fixing the locations of plasma by means of a magnetic field generated by a strong magnet using a technique of magnetron sputtering.

Accordingly, ionized materials can be collected in a concentrated manner at particular positions inside the container's main bodies.

In the case of an exploration target celestial body having thin atmosphere, such as the nucleus of a comet or an ice satellite having internal sea, it is presumed that trace amounts of gas components are present in outer space or gas components are generated from solid microparticles that have impacted. Therefore, it is desirable to use the materials of the ionized material collection zones that can be deposited by reacting with gas substances present in a vacuum and the constituent substances of solid microparticles turned into plasma represented by a reactive sputtering method.

At this time, generated materials can also be controlled by making it possible to control the temperature, which is one of the factors for controlling thermodynamic equilibrium conditions of the materials to react and be deposits. In order to have this function in the device, it is desirable to add a temperature control device having a heater or a Peltier element that can control the temperature of the wall surface from approximately several hundred degrees Celsius to minus several tens of degrees Celsius.

Moreover, in order to identify elements originating from solid microparticles that impact with the material of the ionized material collection zone, isotopic elements can be utilized for the material of the ionized material collection zone, and therefore it is possible to distinguish whether it is an element prepared on the Earth or a component collected in outer space based on differences in isotopic ratio.

An ionized material collecting method using the sample collection device described above is as follows.

The ionized material sample collection device 1, 10, 20, or 30 described above is mounted in a spacecraft, hypervelocity solid microparticles A flying from outer space are caused to rush into the container's main bodies 2, 12, 22, or 31. Mixtures of gas substances and ionized substances originating from the solid microparticles A generated due to collision of the solid microparticles A that have rushed in with the sample impact target 2D, 12D, 22D, or 32D are caused to impact with the ionized material collection zones 3, 23, or 33. Mixtures of gas substances and ionized substances originating from the solid microparticles A are deposited on the ionized material collection zones 3, 23, or 33.

Accordingly, it is possible to reliably capture substance information from solid microparticles impacting at an extreme hypervelocity in outer space.

INDUSTRIAL APPLICABILITY

According to the present invention, it is possible to provide an ionized material sample collection device and a collecting method capable of reliably capturing substance information from solid microparticles impacting at an extreme hypervelocity in outer space.

Since solid microparticles present in outer space are expected to include information related to the origins and evolution of the solar system, the Earth, seawater, source materials for life, and the like, according to the present invention, it is possible to contribute to development of new scientific knowledge.

REFERENCE SIGNS LIST

1 Sample collection device
2 Container's main body

2A Surrounding wall
2B Bottom wall
2C Sample entrance
2D Sample impact target
3 Ionized material collection zone
10 Sample collection device
12 Container's main body
12A Surrounding wall
12B Bottom wall
12C Sample entrance
12D Sample impact target
13 Protrusion
20 Sample collection device
22 Container's main body
22A Surrounding wall
22B Bottom wall
22C Sample entrance
22D Sample impact target
23 Ionized material collection zone
23*a*, 23*b* Split layers
30 Sample collection device
31 Container's main body
33 Ionized material collection zone
A Solid microparticle
B Mixture

The invention claimed is:

1. An ionized material sample collection device comprising:

one or a plurality of container's main bodies that each has a surrounding wall and a bottom wall and has a sample entrance in an upper portion of the surrounding wall;

a sample impact target that is formed in the bottom portion of each of the container's main bodies; and one or more ionized material collection zones that are formed on at least one of the inner surfaces and the bottom surface of the surrounding wall of each of the container's main bodies, wherein a plurality of the ionized material collection zones are formed on at least one of the inner surfaces and the bottom surface of the surrounding wall, and each of the plurality of ionized material collection zones is an ionized material collection zone which has an affinity for a different element.

2. The ionized material sample collection device according to claim 1, wherein the ionized material collection zone is an ionized material collection zone in which ionized materials generated from particles that have impacted with the sample impact target at a hypervelocity are deposited.

3. The ionized material sample collection device according to claim 1, wherein the ionized material collection zone is an annular ionized material collection zone which has a predetermined width from the bottom wall side to the sample entrance side of the surrounding wall and is formed on the inner surfaces of the surrounding wall or an ionized material collection zone which is formed on the bottom surface, and a plurality of the ionized material collection zones are formed from the bottom surface side toward the sample entrance side.

4. The ionized material sample collection device according to claim 1 comprising:

a plurality of container's main bodies, wherein each of the ionized material collection zones formed in each container is an ionized material collection zone which has an affinity for a different element.

5. The ionized material sample collection device according to claim 1, wherein the ionized material collection zone is made of one or more of a resin, stainless steel, boron-doped silicon, titanium, gold, lithium, copper, a hydrogen absorbing alloy, a transition metal, a metal oxide, and tungsten.

6. The ionized material sample collection device according to claim 1, wherein the ionized material collection zone is an annular ionized material collection zone which has a predetermined width from the bottom wall side to the sample entrance side of the surrounding wall and is formed on the inner surfaces of the surrounding wall or an ionized material collection zone which is formed on the bottom surface, and a plurality of the ionized material collection zones are formed from the bottom surface side toward the sample entrance side, and the ionized material collection zone is split into a plurality of split layers in a circumferential direction of the surrounding wall, and each of the plurality of split layers has an affinity for a different element.

7. The ionized material sample collection device according to claim 6, wherein the ionized material collection zone is made of one or more of a resin, stainless steel, boron-doped silicon, titanium, gold, lithium, copper, a hydrogen absorbing alloy, a transition metal, a metal oxide, and tungsten.

8. The ionized material sample collection device according to claim 1, wherein the sample impact target is constituted of a concave curved surface or an uneven surface.

9. An ionized material collecting method comprising:

mounting the ionized material sample collection device according to claim 1 in a spacecraft;

causing hypervelocity solid microparticles flying from outer space to rush into the container's main bodies;

causing a mixture of gas substances and ionized substances originating from the solid microparticles generated due to collision of the solid microparticles that have rushed in with the sample impact target to impact with the ionized material collection zones; and depositing the mixture of gas substances and ionized substances originating from the solid microparticles on the ionized material collection zones.

* * * * *